United States Patent
He et al.

(10) Patent No.: US 10,482,091 B2
(45) Date of Patent: Nov. 19, 2019

(54) COMPUTERIZED SYSTEM AND METHOD FOR HIGH-QUALITY AND HIGH-RANKING DIGITAL CONTENT DISCOVERY

(71) Applicant: OATH INC., New York, NY (US)

(72) Inventors: Yunlong He, Sunnyvale, CA (US); Dawei Yin, Sunnyvale, CA (US); Yi Chang, Sunnyvale, CA (US)

(73) Assignee: OATH INC., New York, NY (US)

( * ) Notice: Subject to any disclaimer, the term of this patent is extended or adjusted under 35 U.S.C. 154(b) by 407 days.

(21) Appl. No.: 15/074,028

(22) Filed: Mar. 18, 2016

(65) Prior Publication Data

US 2017/0270122 A1 Sep. 21, 2017

(51) Int. Cl.

| | |
|---|---|
| *G06F 16/2457* | (2019.01) |
| *G06F 16/583* | (2019.01) |
| *G06F 16/248* | (2019.01) |
| *G06N 20/00* | (2019.01) |
| *G06Q 30/02* | (2012.01) |

(52) U.S. Cl.
CPC ...... *G06F 16/24578* (2019.01); *G06F 16/248* (2019.01); *G06F 16/5838* (2019.01); *G06N 20/00* (2019.01); *G06Q 30/0277* (2013.01)

(58) Field of Classification Search
CPC ........... G06F 17/30247; G06F 17/3053; G06F 17/30675; G06F 16/24578; G06F 16/583; G06F 16/5854; G06F 16/248; G06F 16/9038; G06K 2009/0032; G06K 9/00281; G06K 9/00288; G06K 9/00295; G06K 9/4652; G06K 9/622; G06K 9/6223;

(Continued)

(56) References Cited

U.S. PATENT DOCUMENTS

2007/0209025 A1* 9/2007 Jing .................. G06F 17/30265
2007/0239764 A1* 10/2007 Song ................. G06F 17/30247
(Continued)

OTHER PUBLICATIONS

D. Sculley; "Combined Regression and Ranking" ; KDD'10, Jul. 25-28, 2010 (Year: 2010).*

(Continued)

*Primary Examiner* — Dennis Truong
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide a unified digital content discovery framework that implements a combination of a logistic loss function and a pair-wise loss function for information retrieval. The logistic loss function reduces non-relevant images from appearing in the retrieved results, while the pair-wise loss function ensures that the highest-quality content is included in such results. The combination of such functions provides a search information retrieval system with the novel functionality of quantifying a search results' relevance and quality in accordance with the searcher's intent.

18 Claims, 7 Drawing Sheets

(58) Field of Classification Search
CPC ........... G06K 9/00362; G06K 9/00624; G06K 9/00677; G06N 20/00
USPC ........ 707/723, 729, 748, 706; 382/118, 190, 382/224, 218; 706/12; 715/968
See application file for complete search history.

(56) References Cited

U.S. PATENT DOCUMENTS

| | | | | |
|---|---|---|---|---|
| 2008/0285860 | A1* | 11/2008 | Datta | G06K 9/00624 382/224 |
| 2010/0082617 | A1* | 4/2010 | Liu | G06F 17/30675 707/729 |
| 2011/0064308 | A1* | 3/2011 | Stein | G06K 9/4638 382/170 |
| 2011/0087673 | A1* | 4/2011 | Chen | G06F 16/951 707/748 |
| 2011/0116690 | A1* | 5/2011 | Ross | G06K 9/00295 382/118 |
| 2011/0145175 | A1* | 6/2011 | Agarwal | G06N 20/00 706/12 |
| 2011/0170768 | A1* | 7/2011 | Alldrin | G06K 9/4661 382/159 |
| 2011/0196859 | A1* | 8/2011 | Mei | G06F 17/3053 707/723 |
| 2012/0271806 | A1* | 10/2012 | Ieong | G06F 17/30867 707/706 |
| 2013/0121584 | A1* | 5/2013 | Bourdev | G06K 9/00281 382/190 |
| 2014/0093174 | A1* | 4/2014 | Zhang | G06F 17/30259 382/190 |
| 2016/0321283 | A1* | 11/2016 | Shen | G06F 17/30699 |
| 2018/0061459 | A1* | 3/2018 | Song | G11B 27/34 |

OTHER PUBLICATIONS

Sculley "Combined Regression and Ranking", Jul. 25-28, 2010 ACM (Year: 2010).*

* cited by examiner

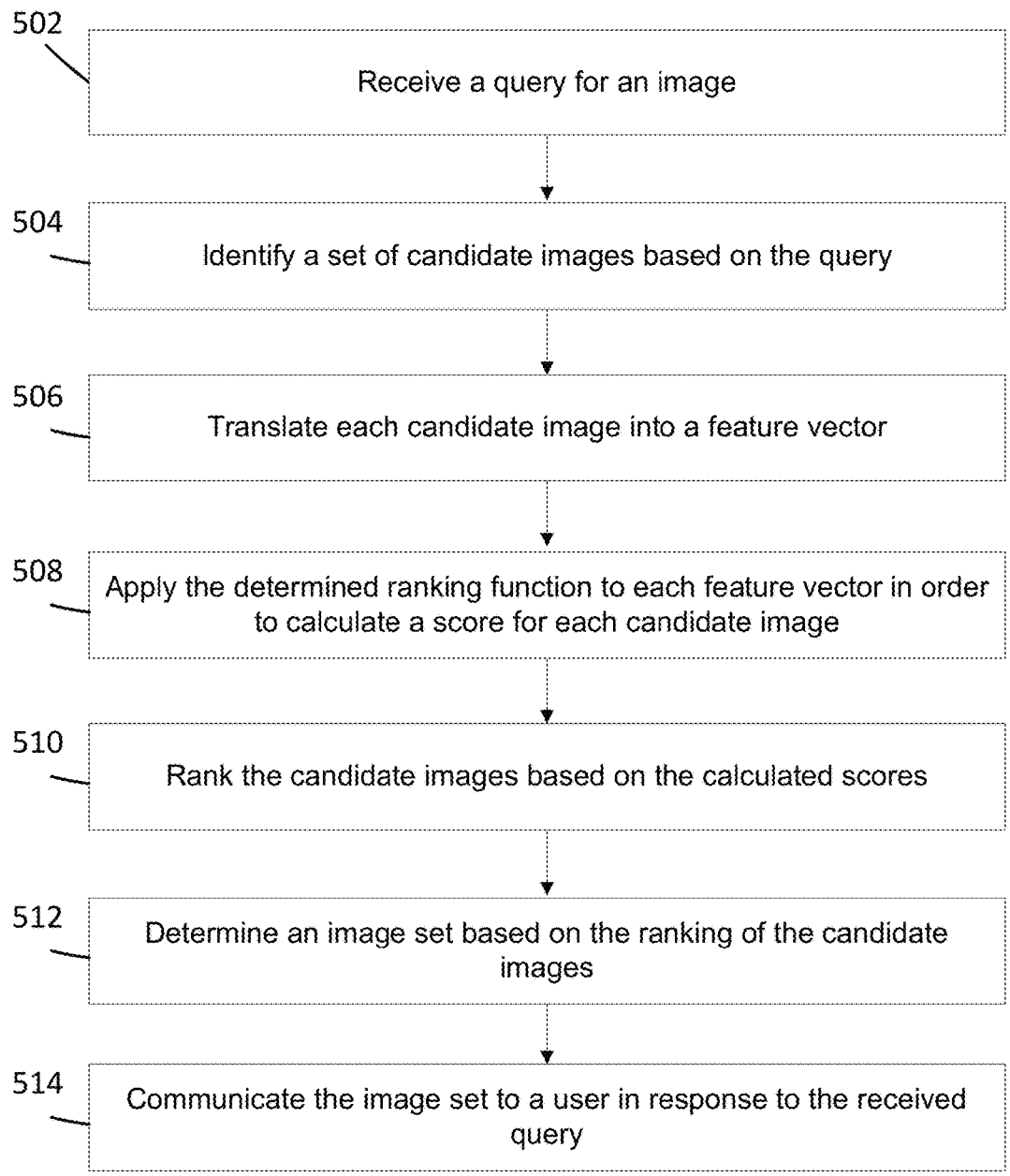

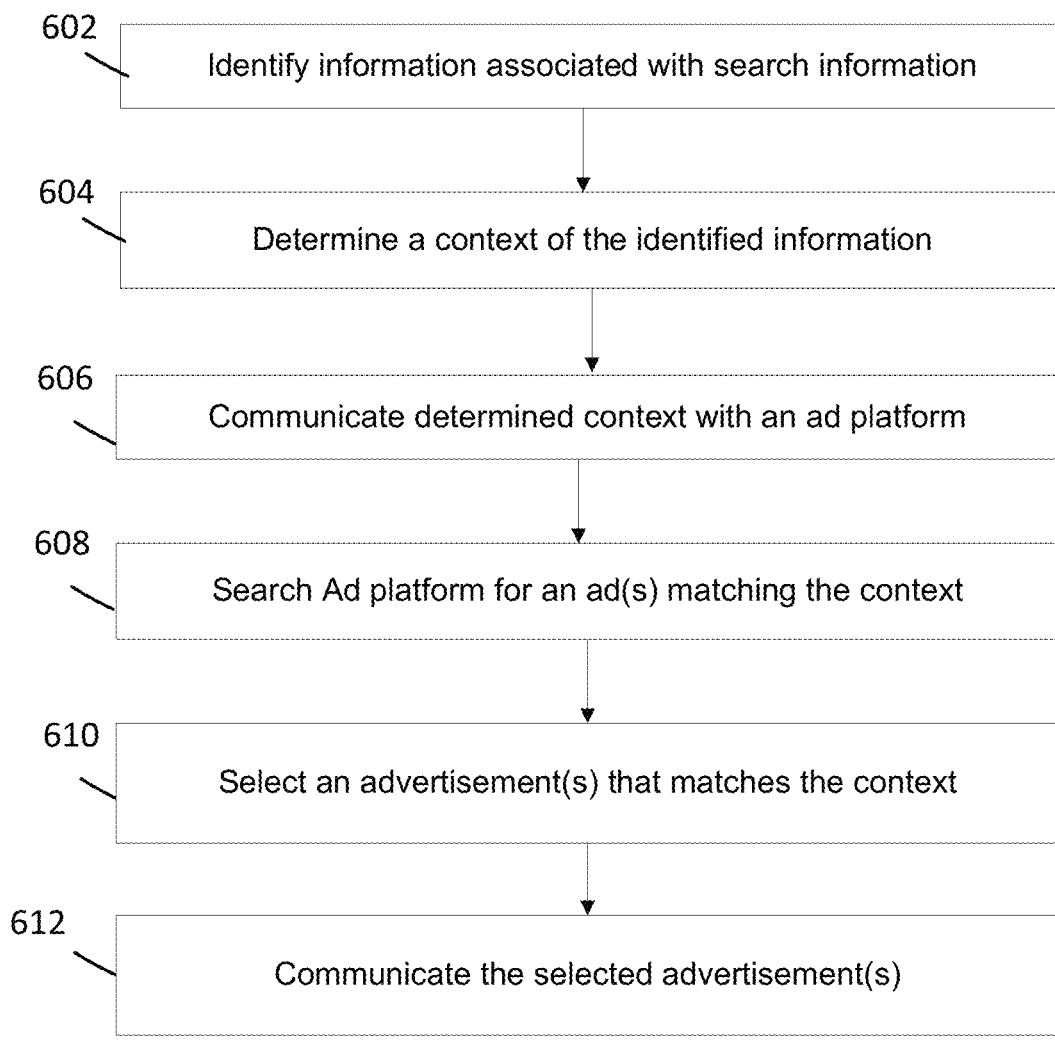

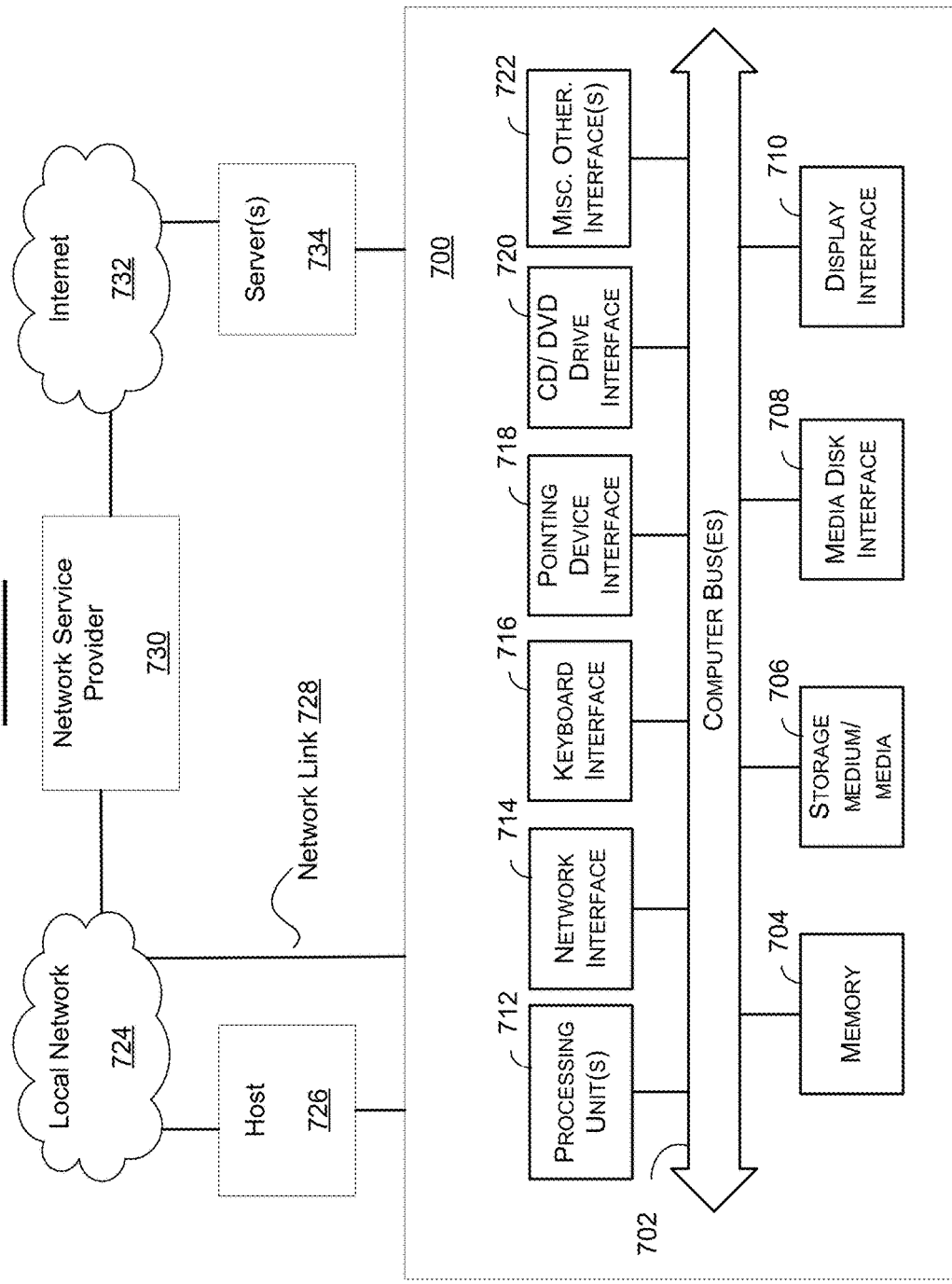

COMPUTERIZED SYSTEM AND METHOD FOR HIGH-QUALITY AND HIGH-RANKING DIGITAL CONTENT DISCOVERY

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing, recommending and/or hosting computer systems and/or platforms by modifying the capabilities and providing non-native functionality to such systems and/or platforms for a novel and improved framework for obtaining highly-relevant and high-quality results when performing digital content discovery on a network.

SUMMARY

The present disclosure provides novel digital content discovery systems and methods that simultaneously improve the quality and relevance (or accuracy) of the results. According to some embodiments, the disclosed systems and methods can be embodied as a unified framework that implements the combination of a logistic loss function and a pair-wise loss function as a ranking model for information retrieval. The logistic loss function reduces non-relevant content from being included within the search results, while the pair-wise loss function ensures that only the highest-quality content is included in the search results.

Currently, in modern content search systems, services and platforms, there is a need to present results to users that contain not only the content that satisfies that user's search intent but also presents content that is visually appealing or interesting to increase engagement with the results. This need is especially acute when the search result is being delivered to a mobile device or mobile application. Conventional systems and platforms lack the functionality and capability for addressing such concerns. As discussed herein, the combination of logistic loss and pair-wise loss functions provides novel functionality for a search system and/or platform, as well as any other known or to be known information retrieval system, to simultaneously quantify a search results' relevance and quality in accordance with the searcher's intent.

It will be recognized from the disclosure herein that embodiments of disclosed systems and methods provide improvements to a number of technology areas, for example those related to systems and processes that handle or process content for users or business entities, and provide for improved user loyalty, improved content publishing, improved advertising opportunities, improved content search results, and the like. As evidenced from the discussion below, the disclosed systems and methods enable a more robust, accurate electronic network-based search for content to be performed by leveraging the quality and accuracy of the search methodologies discussed herein. As discussed in more detail below, this can also lead to increased ad coverage and revenue—e.g., an increased click-through rate (CTR) of provided media content (e.g., how many views, shares, reblogs, saves, downloads and the like) thereby increasing not only the virality of the provided content, but also the effectiveness (and value) of the content providing system in targeting interests of users.

In accordance with one or more embodiments, a method is disclosed for a novel and improved framework for obtaining highly-relevant (e.g., most relevant) and high-quality results when performing digital content discovery on a network, as disclosed herein.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for obtaining highly-relevant and high-quality results when performing digital content discovery on a network.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 5 is a flowchart illustrating steps performed in accordance with some embodiments of the present disclosure;

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DESCRIPTION OF EMBODIMENTS

Figure 1:
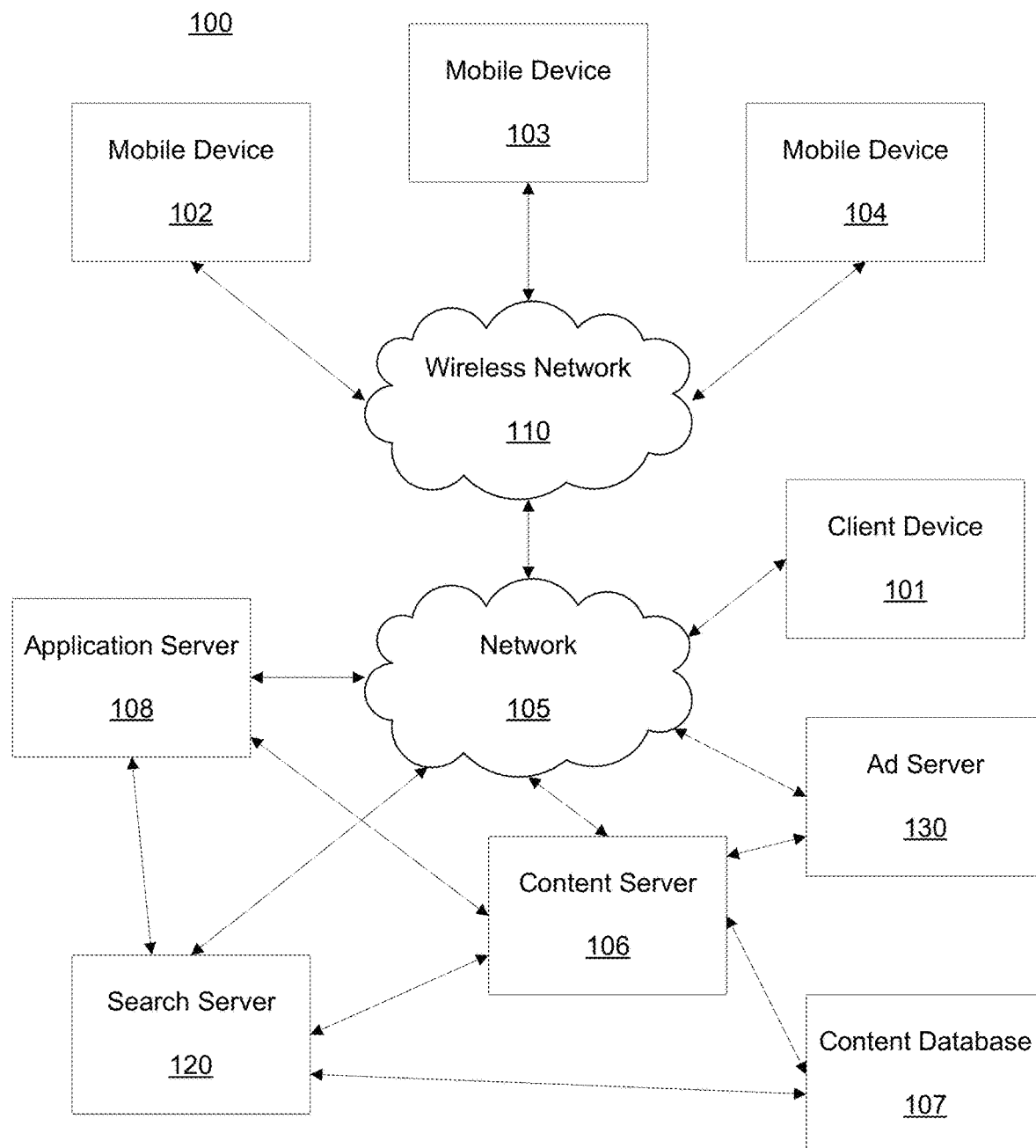
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. By way of background, the wealth of digital images (e.g., image archives) on the Internet is ever-increasing due to archives of private users, marketers, content from news publishing agencies, internet communities, and the like. In line with the size of the archives, the difficulty of discovering relevant and high-quality digital content has become increasingly difficult and costly, as well as technically cumbersome (e.g., longer than normal search times).

The disclosed systems and methods remedy the shortcomings in the art and provide improved computer systems and methods that institute increased functionality to the computer executing the disclosed systems and methods by automatically and simultaneously identifying highly-relevant, high-quality content. As discussed below, the identification of high-quality content can yield improvements in numerous technological fields, such as for example image search, content promotion and recommendation, image monetization, ad monetization, and/or content selection from a set of captured imagery, to name a few.

The present disclosure provides digital content discovery systems and methods that simultaneously improve the quality and relevance (or accuracy) of the results via a novel unified framework. According to some embodiments, the disclosed unified framework implements the combination of a logistic loss function and a pair-wise loss function as a ranking model for information retrieval. The logistic loss function of the disclosed unified framework reduces non-relevant content from being included within the search results, while the pair-wise loss function ensures that only the highest-quality content is included in the search results. The combination of such functions provides a search system and/or platform, as well as any other known or to be known information retrieval system, with the novel functionality of quantifying a search results' relevance and quality in accordance with the searcher's intent (as derived, identified or determined from the search request).

For purposes of this disclosure, the identification of content will be in large measure directed to analyzing and discovering digital images; however, it should not be construed as limiting the scope of the instant application to solely images, as any known or to be known type of content, media and/or multi-media (e.g., text, video, audio, multimedia, RSS feeds, graphics interchange format (GIF) files, and the like) is applicable to the disclosed systems and methods discussed herein.

As understood by those of skill in the art, the term "high-quality" refers to an item of digital content satisfying a quality threshold, which can be set by a user, site administrator, artist creating/capturing the content, the system, service or platform hosting the content, or some combination thereof. In a non-limiting example, "high-quality" can refer to the digital content being of interest to a user(s), where interest (or user engagement) can be based on the number of times a user has interacted with the content (e.g., viewed, shared, commented, downloaded, re-blogged, re-posted, favorited, liked, and the like) at or above the quality threshold. In another non-limiting example, "high-quality" content can relay that the content is aesthetically pleasing or technically sound, in that the data associated with the content produces a resolution, focus, pixel quality, size, dimension, color scheme, exposure, white balance and the like, or some combination thereof that satisfies the quality threshold. For example, as discussed above, an image's quality can be determined via implementation of a pair-wise loss function which scores the image's quality based on the image's parameters or features.

As understood by those of skill in the art, the term or terms "relevant" or "highly-relevant," which may be used interchangeably, refers to an item of digital content satisfying a relevance threshold, which can be set by a user, site administrator, artist creating/capturing the content, the system, service or platform hosting the content, or some combination thereof. As discussed herein, relevancy can be quantified (or scored). For example, as discussed above, an image's relevancy can be determined via implementation of a logistic loss function which quantifies an images parameters or features. In another non-limiting example, relevancy can be based on a discounted cumulative gain (DCG) measure of ranking quality, as discussed in more detail below. As understood by those of skill in the art, DCG can measure the effectiveness of web search engine algorithms or related applications by analyzing the returned results against a graded relevance scale of content items in a search engine result set. DCG measures the usefulness, or gain, of a content item based on its position in the result list. The gain is accumulated from the top of the result list to the bottom with the gain of each result discounted at lower ranks.

Thus, as discussed in more detail below, the disclosed systems and methods provide a unified framework of pair-wise and logistic loss functions being implemented within machine-learned ranking (MLR) systems and methods which construct ranking models of an image collection that are used when performing image retrieval upon receiving a search query. This leads to higher quality and relevant images being returned to a user, which not only achieves satisfaction of the user's intent (from his/her search query) but also leads to increased user engagement respective to the image and/or site, service or application hosting/providing the image, as discussed herein.

As discussed in more detail below at least in relation to FIG. 6, according to some embodiments, information associated with or derived from, inter alia, stored images and search queries, as well as rendered, communicated and/or provided content (from a search result) can be used for monetization purposes and targeted advertising when providing, delivering or enabling access to such media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as a photo sharing site/service (e.g., Tumblr®), an email platform or social networking site, a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a photo sharing application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo! ® Search), a mail or messaging application (e.g., Yahoo! ® Mail, Yahoo! ® Messenger), and the like, can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
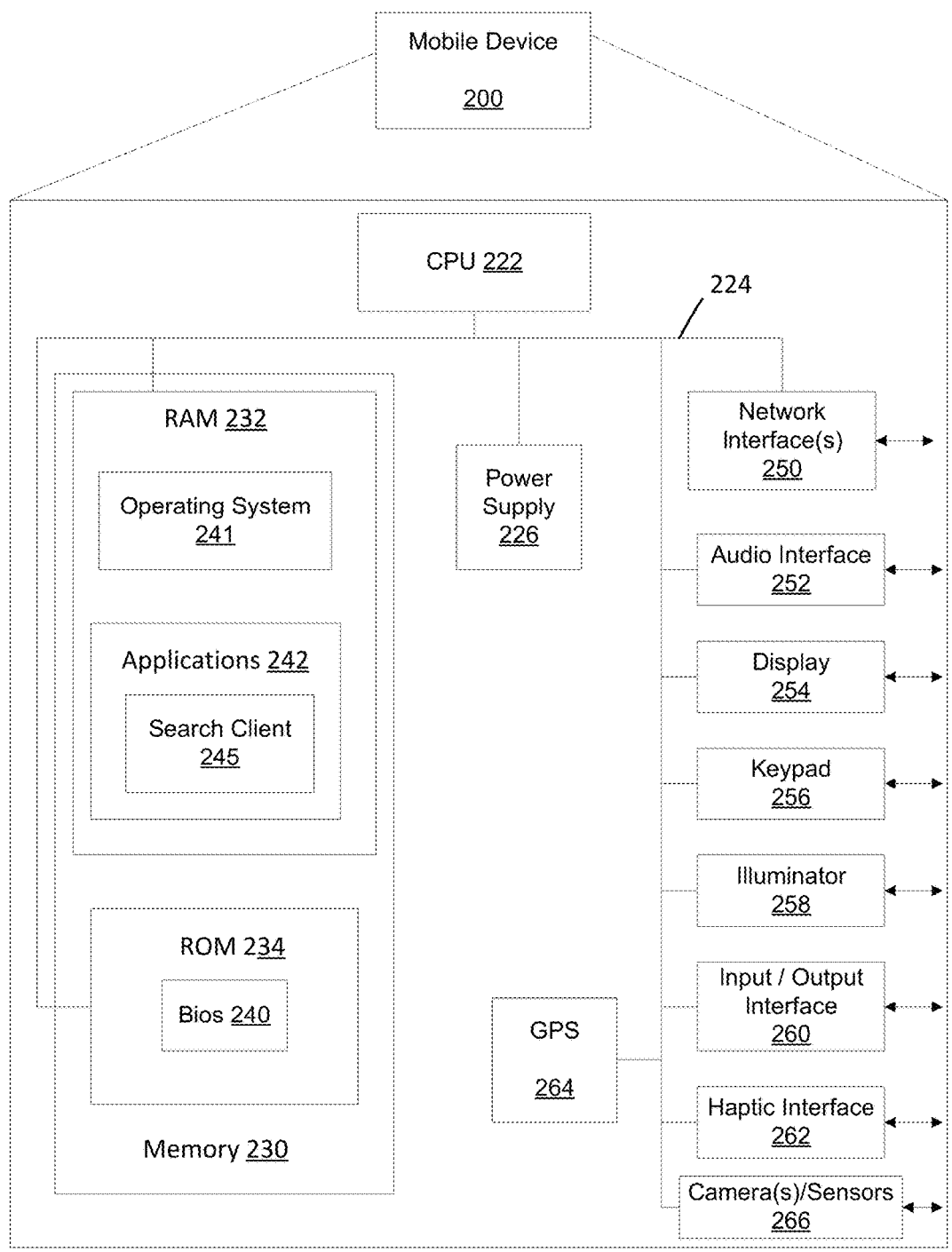
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
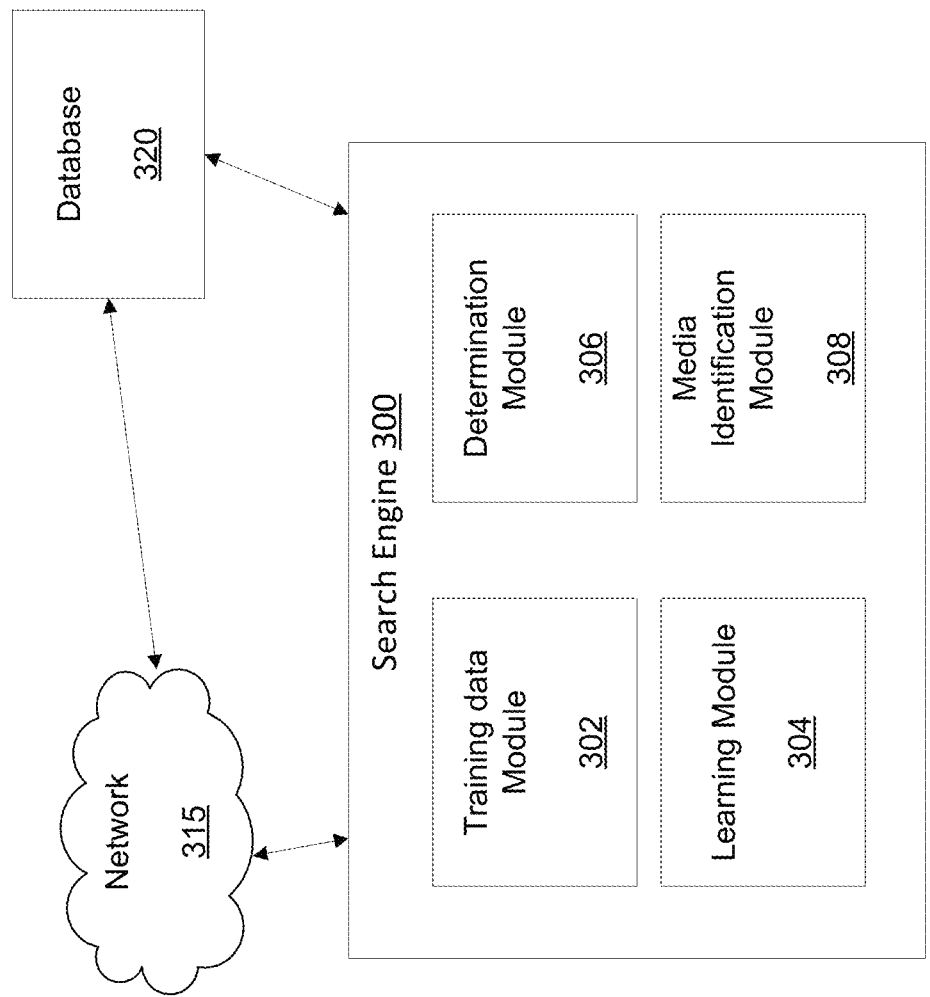
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a search engine 300, network 315 and database 320. The search engine 300 can be a special purpose machine or processor and could be hosted by an application server, content server, social networking server, web server, search server, content provider, email service provider, ad server, user's computing device, and the like, or any combination thereof.

According to some embodiments, search engine 300 can be embodied as a stand-alone application that executes on a user device. In some embodiments, the search engine 300 can function as an application installed on the user's device, and in some embodiments, such application can be a web-based application accessed by the user device over a network. In some embodiments, the search engine 300 can be installed as an augmenting script, program or application to another media and/or content serving application, such as, for example, Yahoo! ® Search, Yahoo! ® Mail, Flickr®, Tumblr®, Twitter®, Instagram®, SnapChat®, Facebook®, Amazon®, EBay® and the like.

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of images, user data and associated user metadata. Such information can be stored in the database 320 independently and/or as a linked or associated dataset. It should be understood that the image data (and metadata) in the database 320 can be any type of image information and type, whether known or to be known, without departing from the scope of the present disclosure.

Database 320 comprises a dataset of data and metadata associated with local and/or network information related to users, services, applications, user-generated content, third party provided content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

For purposes of the present disclosure, as discussed above, images (which are stored and located in database 320) as a whole are discussed within some embodiments; however, it should not be construed to limit the applications of the systems and methods discussed herein. Indeed, while reference is made throughout the instant disclosure to images (or pictures), other forms of user generated content and associated information, including for example text, audio, video, GIF, multi-media, RSS feed information can be used without departing from the scope of the instant application, which can thereby be communicated and/or accessed and processed by the search engine 300 according to the systems and methods discussed herein.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes rendering and/or displaying content, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, content generating and hosting sites or providers that enable users to search for, upload, download, share, edit or otherwise avail users to content (e.g., Yahoo! ® Search, Yahoo!® Mobile applications, Yahoo! ® Mail, Flickr®, Tumblr®, Twitter®, Instagram®, SnapChat®, Facebook®, and the like). Such sites may also enable users to search for and purchase products or services based on information provided by those sites, such as, for example, Amazon®, EBay® and the like. In some embodiments, database 320 can comprise data and metadata associated with such content information from one and/or an assortment of media hosting sites.

In some embodiments, the information stored in database 320 can be represented as an n-dimensional vector (or feature vector) for each stored data/metadata item, where the information associated with, for example, the stored images can corresponds to a node(s) on the vector of an image. As such, database 320 can store and index content information in database 320 as linked set of data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology.

While the discussion of some embodiments involves vector analysis of stored information, as discussed above, the information can be analyzed, stored and indexed according to any known or to be known computational analysis technique or algorithm, such as, but not limited to, word2vec analysis, cluster analysis, data mining, Bayesian network analysis, Hidden Markov models, artificial neural network analysis, logical model and/or tree analysis, and the like.

In some embodiments, database 320 can be a single database housing information associated with one or more services and/or content providers, and in some embodiments, database 320 can be configured as a linked set of data stores that provides such information, as each datastore in the set is associated with and/or unique to a specific service and/or content provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the search engine 300, and the database of stored resources 320. Indeed, as illustrated in FIG. 3, the search engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as search engine 300, and includes training data module 302, learning module 304, determination module 306 and media identification module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIGS. 4-5.

Figure 4:
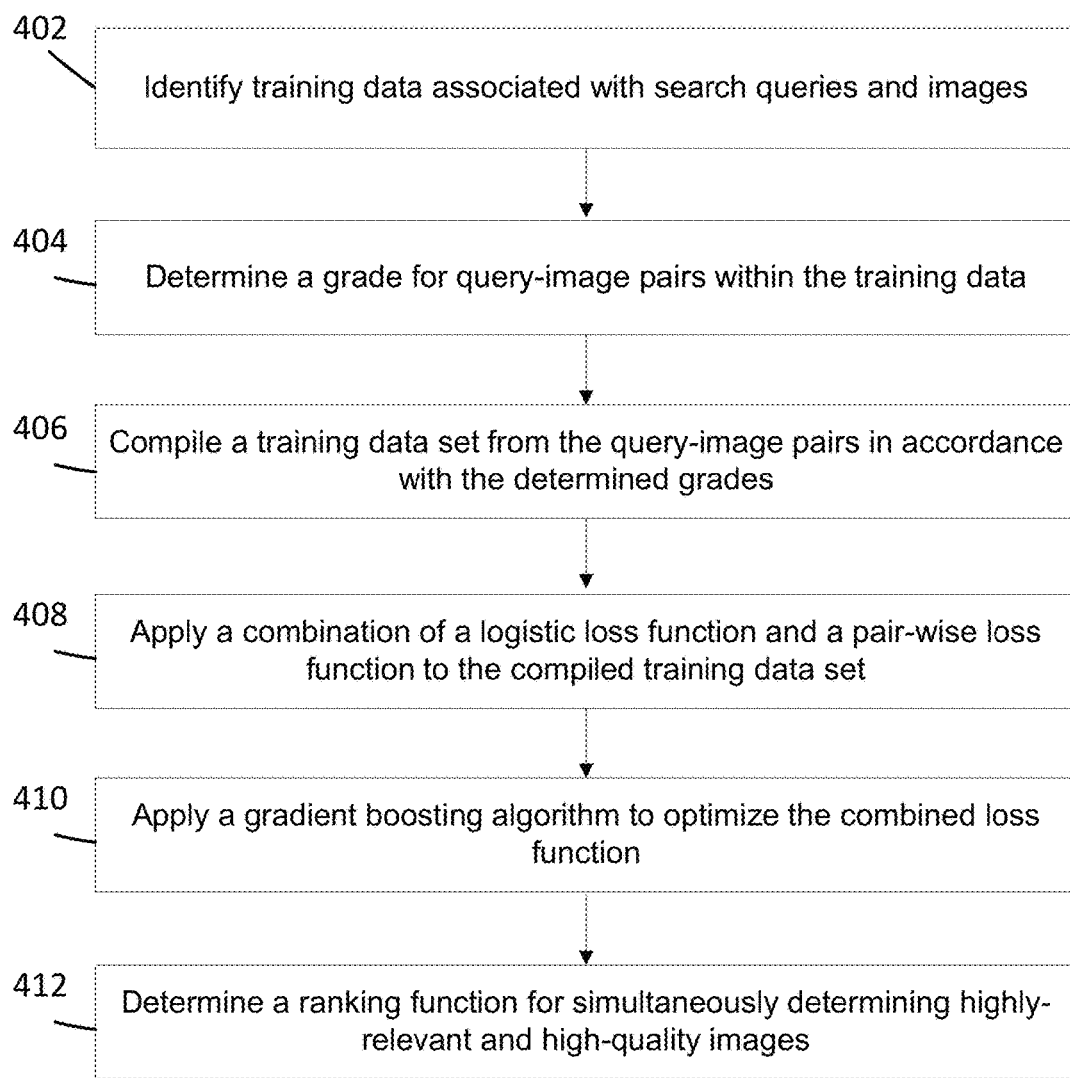
FIG. 4 is a flowchart illustrating steps performed in accordance with some embodiments of the present disclosure.

Turning to FIG. 4, Process 400 details steps performed in accordance with some embodiments of the present disclosure for automatically identifying relevant, high-quality content. Process 400 is performed by the search engine 300, and specifically by the training data module 302 (which performs Steps 402-406) and the learning module 304 (which performs Steps 408-412), which are special purpose modules as detailed below. The search engine 300, through models 302 and 304 can model a collection of images. Such modeling is performed for purposes of training the search engine 300 to identify relevant, high-quality content, which, as discussed below, can be used for identifying other relevant, high-quality (as discussed below in relation to FIG. 5).

As discussed herein, the disclosed systems and methods effectuate cost effective, accurate and computationally efficient identification of high-quality, top-ranked images. The images can be images of and/or associated with a user generated content (UGC) collection, a provider or service generated collection, or some combination thereof. As discussed above, for purposes of discussion related to FIG. 4, the identification of content will be focused on discovering digital images; however, it should not be construed as limiting, as any known or to be known type of content, media and/or multi-media (e.g., text, video, audio, multi-media, RSS feeds, graphics interchange format (GIF) files, and the like) is applicable to the disclosed systems and methods discussed herein.

The disclosed systems and methods, through at least the implementation of Process 400, incorporate image quality factors into the "leaning to rank" framework by using image quality related features, image quality labels in training data, as well as new loss functions, as discussed herein.

"Learning to rank" framework is a manner of ranking search results using a machine learning model where all the content items being searched (referred to as "documents") are represented by feature vectors. The feature vector, as discussed above, for each document comprises information reflecting the relevance of the document to a query. For example, for a given query q, the associated document d can be represented by a vector $x=\Phi(d, q)$, where $\Phi$ is a feature extractor. Typical features used in learning to rank include, but are not limited to, the frequencies of the query terms in the document, the BM25 and PageRank scores, and the relationship between this document and other documents, and the like. In the disclosed systems and methods, the retrieved documents are images and the features not only reflect the relevance of the images but also the quality of the images. Therefore, the features used to reflect the relevance of the images include image-specific features, such as, but not limited to, frequencies of the query terms in the filename of the image, object saliency scores in the image, face position in the images, and the like. Moreover, since the disclosed systems and methods are targeting to rank high quality images over low quality images, quality-indicating features can be identified and/or extracted from feature vectors, such as, but not limited to, sharpness, contrast, saturation, emotion arousal scores, and the like. According to some embodiments of the disclosed systems and methods, the number of features for each image, i.e., the dimension of the vector $x=\Phi(d, q)$, is more than a predetermined threshold value—for example, more than 300.

As discussed below in reference to the steps of Process 400, the learning to rank framework, which is executed by the search engine 300, finds a ranking function $f(x)$ which assigns a score to each query document pair $(q, d)$ and then ranks the documents according to the score.

Process 400 begins with Step 402 where training data associated with search queries and images is identified. The training data is composed of a set of queries and a set of images. As discussed below, the training data will be compiled into a set of triples: {query, document, grade}, where the "grade" indicates the degree of relevance of the document to the query. The identification of the training data enables the determination of the ranking function $f(x)$. That is, as evidenced from the below discussion, the learning to rank framework implements (or adapts) a machine learning algorithm, methodology or technique that will result in minimizing a loss function which is constructed from the training data. In some embodiments, for example, the machine learning algorithm, methodology or technique can be, but is not limited to, gradient boosting, as discussed below.

In conventional systems, each grade can be one element in an ordinal set. For example, a set of PEGFB labels: {perfect, excellent, good, fair, bad}. In some embodiments, such labels can be judged and applied to the query-document pairing by search editors.

In the disclosed systems and methods, the grades utilized in conventional systems complicate the judgment task because the relevance and image quality must be considered at the same time. In order to reduce such drawbacks and confusion in image search editorial judging processes, the training data used in the instant disclosure, in some embodiments, is identified (and collected) in the following way, Step 404:

For each query image pair in the identified training set, an assigned relevance label is applied. In some embodiments, such label can be applied by a human editor. The labels of relevance include, but are not limited to, "Highly Relevant", "Moderately Relevant" and "Not Relevant".

For each query image pair, a label of quality is also assigned. In some embodiments, such label can be applied by a human editor. The labels of quality include, but are not limited to, "Exceptional", "Professional", "Good", "Fair" and "Bad".

The two labels are then combined to map into the PEGFB labels, as illustrated in the below Table 1, which illustrates the mapping from a relevance score and a quality score to a 5-point PEGFB label:

|  | Exceptional | Professional | Good | Fair | Bad |
| --- | --- | --- | --- | --- | --- |
| Highly Relevant | Perfect | Excellent | Good | Fair | Bad |
| Moderately Relevant | Fair | Fair | Fair | Fair | Bad |
| Not Relevant | Bad | Bad | Bad | Bad | Bad |

Using this editorial judgment method, the disclosed systems and methods are able to reduce the confusion in image search editorial judging process, which leads to a more efficient usage of the editorial resource(s).

Process 400 then turns to Step 406. After the editorial judgment process of Step 404, a training data set is compiled, which is represented as follows: $\{(x_j^q, y_j^q)\}$, where q goes from 1 to n (the number of queries), j goes from 1 to $m_q$ (the number of images for query q), $x_j^q \in R^d$ is the d-dimensional feature vector for the pair of query q and the $j^{th}$ image for query q, $y_j^q$ is the combined label (e.g., PEGFB) for $x_j^q$. Step 406.

In order to train the search engine 300 from the training data set $\{(x_j^q, y_j^q)\}$, the following candidate function is determined:

$$f^* = \arg\min_{f \in F} L(f, \{(x_j^q, y_j^q)\}),$$

where F is the search space for the candidate ranking function and L is the loss function. According to some embodiments, F is the sum of decision tress utilized by the editors when determining the grade of query-image pairs. In some embodiments, the number of quality factors used for analyzing an image (from Step 404) is a predetermined number, for example, 20; therefore, in such embodiments, F is then a maximum of 20.

According to some embodiments, the key factor in the determination of the ranking function, as discussed herein, is the design of the loss function L because the implementation of the loss function leads to a high-quality ranking function. Thus, in Step 408 a logistic loss function and a pair-wise loss function are simultaneously applied to the compiled training data set.

In some embodiments, there are main two categories of loss functions used. The first one is a point-wise loss function:

$$L(f, \{(x_j^q, y_j^q)\}) = \sum_{qj} l(f(x_j^q), y_j^q),$$

where l is a regression loss $l(x,y):=\|x-y\|^2$, or
l is a logistic loss $l(x,y):=\log(1+\exp(-yx))$.

The second category of loss functions is called pair-wise loss function:

$$L(f, \{(x_j^q, y_j^q)\}) = \sum_q \sum_{i,j,y_i^q > y_j^q}^{m_q} l(f(x_i^q) - f(x_j^q)), \quad \text{(Equation 1)}$$

where l is a quadratic hinge loss function $l(t):=\max(0, 1-t)^2$.

The disclosed systems and methods combine the pair-wise loss and the logistic loss into the framework for the novel learning to rank functionality discussed herein (as in Step 408). The logistic loss aims at reducing non-relevant images in top results, while the pair-wise loss incorporates the preference of image quality.

In some embodiments, in order to apply the combined pair-wise and logistic loss functions to the training data set (or, in some embodiments, referred to as construction the loss-function based on the training data), a binary label $z_j^q$ is utilized in accordance with the relevance judgments (from Step 404). For example, the relevance label "Very Relevant" is adjusted (or "flattened") to "Positive":($z_j^q=+1$), and the relevance label "Moderately Relevant" and "Not Relevant" is adjusted to "Negative":=-1). Utilizing such binary classification will result in a decrease in the number of non-relevant images for top retrieved results. However, only binary classification is insufficient for image ranking. Therefore, to incorporate image quality into the framework, a pair-wise loss function (Equation 1) is utilized, where the order $y_i^q > y_j^q$ is determined by the PEGFB label from Table 1. Combining the two loss functions results in a loss function which can be used to learn the ranking function $f(x)$:

$$L(f, \{(x_j^q, y_j^q, z_j^q)\}) = \sum_{q,j} \log(1 + \exp(-z_j^q)f(x_j^q))) + \alpha \sum_q \sum_{i,j,y_i^q > y_j^q}^{m_q} \max(0, 1 - f(x_i^q) + f(x_j^q))^2$$

(Equation 2),
where α is the parameter for balancing the two kinds of loss functions.

According to some embodiments, the logistic loss function as discussed above can utilize a discounted cumulative gain (DCG) measure of ranking quality, as discussed above. In some embodiments, for a ranked list of N documents, the following variation of DCG can be utilized:

$$DCG_N = \sum_{i=1}^{N} \frac{G_i}{\log_2(i+1)},$$

(Equation 3 - Quality-demoted Discounted Cumulative Gain (QDCG))

where $G_i$ represents the relevance score assigned to the document at position I on the 5-point PEGFB score: 10 for "Perfect," 7 for "Excellent," 3 for "Good," 1 for "Fair," and 0 for "Bad." Higher degree of relevance corresponds to higher value of DCG.

In some image search embodiments, QDCG is used as a primary measurement of search engine performance. For each image in the ranked list of N images (N is set to 10, for example), a label of relevance and a label of quality is given by the editors. As discussed above in Step 404, the labels of relevance include "Highly Relevant", "Moderately Relevant" and "Not Relevant"; and the labels of quality include "Exceptional", "Professional", "Good", "Fair" and "Bad". The two labels are then combined to map into the PEGFB labels according Table 1. QDCG is then defined using the definition of DCG in Equation 3 and the scores $G_i$ given by the Table 1. QDCG not only measures the relevance performance of an image search engine but also the quality of the ranked image list.

Next, in Step 410, a gradient boosting algorithm (e.g., Gbrank) is applied to Equation 2 (from Step 408) to optimize (e.g., minimize) the loss function constructed from the training data. It should be understood that while the discussion herein focuses on utilizing gradient boosting, any type of known or to be known regression and classification algorithm or technique can be utilized herein without departing from the scope of the instant application.

Process 400 then turns to Step 412 where ranking function $f(x)$ is determined from the output of Step 410 (e.g., $f(x)$ is produced from applying gradient boosting to the combined loss function). As discussed in below in relation to FIG. 5, the ranking function $f(x)$ can be deployed at runtime of an image search. That is, for example, once a user types a query q, the query is sent to search engine 300 which returns a set of candidate images. For each candidate image, the search engine 300 collects its features and represents them as feature vectors $x_i$ and then applies the ranking function $f$ to calculate the ranking scores $f(x_i)$. The candidate images are then returned as a ranked set where the order is determined by the ranking scores.

Turning to FIG. 5, Process 500 details steps performed in accordance with some embodiments of the present disclosure for applying the determined ranking function to a search query in order to return the highest ranked (e.g., relevant) and highest-quality images. As discussed above, Process 500 is executed at runtime, or when a query is received or detected whereupon an image search to satisfy the query is performed. Process 500 is performed by the search engine 300, and specifically by the determination module 306 (which performs Steps 502 and 506-510) and the media identification module 308 (which performs Steps 504 and 512-514), which are special purpose modules as detailed below. The search engine 300, through models 306 and 308, implements the learned ranking function (from Process 400) in order to identify high-quality, highly-relevant (accurate or high-ranking) content (e.g., images).

As discussed above, for purposes of discussion related to FIG. 5, the identification of content will be discovering digital images; however, it should not be construed as limiting, as any known or to be known type of content, media and/or multi-media (e.g., text, video, audio, multimedia, RSS feeds, graphics interchange format (GIF) files, and the like) is applicable to the disclosed systems and methods discussed herein.

Process 500 begins with Step 502 where a query for an image is received. The query for an image or images is ultimately a request for content to be communicated to a user.

According to some embodiments, the request can be based on any type of known or to be known process for triggering a request to serve or communicate content to a user, such as, for example, a user requesting content, a user browsing a particular web page and being determined to receive particular content based on such browsing, the user's location, the user's interests derived from his/her user profile, the user's mail activity, the user's search activity, the user's social networking activity, the user's media rendering activity, and the like, or some combination thereof. Step 502's request (or query), therefore, comprises information related to the type of content that should be provided to the user (or desired by the user), which can be based on the activity of the user, as discussed above. In some embodiments, the request can comprise any type of data that can be used as a search, such as, but not limited to, text, audio, images, video, and/or any other type of multi-media content that can be used as a basis for searching for other content.

In Step 504, a search is performed based on the received query (or request) and a set of candidate images are identified. The candidate images are identified from the search using any known or to be known type of image (or document) retrieval in which the top related images to the query are returned. In some embodiments, for example, data and/or metadata of the stored images (in database 320) are analyzed in relation to the query, and those images that have data/metadata related to the query (at or above a threshold) are identified as candidate images. In some embodiments, for example, such data/metadata can include, but is not limited to, the title of the image, author of the image, subject, tags, annotations and the like. In some embodiments, the query can be translated into a feature vector, as discussed above, where the nodes of the query feature vector are compared against the features of the images.

In Step 506, each identified candidate image is translated into a feature vector, where each feature vector is a d-dimensional vector having its features as corresponding nodes on the vector. As discussed above, such features of the images can include, but are not limited to, resolution, focus, pixel quality, size, dimension, color scheme, exposure, white balance and the like. In some embodiments, the features can also, or alternatively include, the title of the image, author of the image, subject, tags, annotations and the like.

In Step 508, the ranking function determined from Process 400 is applied to each candidate image's feature vector. The application of the ranking function results in the calculation of a score for each candidate image. In some embodiments, the score is calculated for the query image pair—i.e., a score for the pair including: the query received in Step 502, and the image(s) identified in Step 504. In some embodiments, the score is calculated for the candidate image and then assigned to a query-(candidate) image pair.

In Step 510, the candidate images (or the query image pairs) are ranked according to their calculated scores. The candidate images that have scores of greater value than other candidate images are ranked higher in such ranking.

In some embodiments, those candidate images with scores at or below a score threshold value may be removed from the candidate set. Such removal can represent that the candidate image's score provided an indication that the candidate image was 1) not relevant to the query, 2) not high-quality, and/or 3) not relevant and not high-quality. Thus, Step 510 can involve comparing the scores for each candidate image against score threshold to determine if they should be included in an image set that is to be provided to the user.

In Step 512, an image set is compiled (or determined) based on the result of the ranking occurring in Step 510. As discussed above, some of the candidate images may be removed due to their scores not satisfying the score threshold. The image set (referred to as a search result), therefore, comprises a ranked set of images, where the images having higher-valued scores are ranked higher in the image set than those images with lower scores.

In Step 514, the compiled image set (or search result) is communicated to a user in response to the received query. The communicated image set comprises the high-quality and highest ranked (or relevant) images to the query, thereby providing the user with an improved search experience. The disclosed systems and methods, as understood by those of skill in the art, can be implemented over mobile platforms; therefore, while conventional systems will dedicate resources to speed and efficiency in providing users content, the disclosed systems and methods can ensure that while speed and efficiency will be maintained, quality and relevance of the content provided to the user will not suffer as a result.

FIG. 6 is a work flow example 600 for serving relevant digital media content associated with advertisements (e.g., digital advertisement content) based on the information associated with the identified media (or content), as discussed above in relation to FIGS. 3-5. Such information, referred to as "search information" for reference purposes only, can include, but is not limited to, analyzed information (i.e., information associated with and/or derived from the stored images), the identity, context and/or type of media content being rendered and/or provided to a user, the content of such media, search results, search queries, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises content relaying promotional content provided by a network associated third party.

By way of a non-limiting example, work flow 600 includes a user searching for and being provided a ranked set of high-quality photographs related to Land Rover® Sports Utility Vehicles (SUVs) as a search result. Based on such information, the user may be provided with digital ad content related to special promotions provided by Land Rover® such as, for example, seasonal deals for leasing or purchasing particular Land Rover® models.

In Step 602, search information is identified. As discussed above, the search information can be based any of the information form search process outlined above with respect to FIGS. 3-5. For purposes of this disclosure, Process 600 will refer to single provided/identified content object (e.g., an image or set of images) as the basis for serving a digital advertisement(s); however, it should not be construed as limiting, as any number of search sessions, identified content items, and/or quantities of information related to applications on a user device and/or media renderable via such applications can form such basis, without departing from the scope of the instant disclosure.

In Step 604, a context is determined based on the identified search information. This context forms a basis for serving advertisements related to the search information. In some embodiments, the context can be determined by determining a category which the search information of Step 602 represents. For example, the category can be related to the content type of the media being searched for, identified, selected or rendered. In some embodiments, the identification of the context from Step 604 can occur before, during and/or after the analysis detailed above with respect to Processes 400-500, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for a digital advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to search for and/or render the media. Step 612. In some embodiments, the selected advertisement is sent directly to each user's computing device. In some embodiments, the selected advertisement is displayed in conjunction with the rendered and/or identified media on the user's device and/or within the application being used to search for and/or render the media.

As shown in FIG. 7, internal architecture 700 of a computing device(s), computing system, computing platform and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk interface 708 and/or media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing image and/or video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, a request for image content;

identifying, via the computing device, a set of candidate images, said identifying comprising searching a database of images and identifying images that correspond to the requested image content;

translating, via the computing device using vector analysis software, each identified candidate image into a feature vector, said feature vector comprising information associated with features of each candidate image;

applying, via the computing device, a ranking function to each feature vector, said application comprising calculating a score for each candidate image based on the ranking function being applied to the feature vector of each candidate image, said ranking function comprising a combined logistic loss function and pair-wise loss function, said application of the ranking function further comprising simultaneously determining a quality value and relevance value for each candidate image via the combined logistic loss function and pair-wise function of the ranking function;

determining, via the computing device, query-image pairs based on the received request and the identified candidate images, each query-image pair comprising information associated with the received request and an individual candidate image from the set of candidate images;

assigning, via the computing device, said calculated score for a candidate image to its respective query-image pair;

ranking, via the computing device, the set of candidate images based on the scores of the applied ranking function, wherein candidate images with higher scores are ranked higher in said set than those with lower scores; and communicating, via the computing device over the network, a search result to a user in response to said request for image content, said search result comprising said ranked set of candidate images.

2. The method of claim 1, wherein said ranking function further comprises a gradient boosting algorithm applied to the combined logistic loss function and pair-wise loss function for minimizing loss.

3. The method of claim 1, wherein said combined logistic loss function and pair-wise loss function is constructed from labeled training data, wherein said training data comprises a set of query-image pairs represented as a set of triples {query, document, grade}.

4. The method of claim 3, wherein each query-image pair is labeled with the relevance value and the quality value.

5. The method of claim 4, wherein said relevance value and said quality value for each query-image pair is combined into a 5-point PEGFB label which is applied to each query-image pair, wherein said PEGFB label provides the grade of the triples which is an indication of an editorial judgment value of each query-image pair in the training data.

6. The method of claim 5, wherein said PEGFB labeling results in the training data being represented as $\{(x_j^q, y_j^q)\}$,
wherein q goes from 1 to n (the number of queries),
wherein j goes from 1 to $m_q$ (the number of images for query q),
wherein $x_j^q \in R^d$ is the d-dimensional feature vector for the pair of query q and the $j^{th}$ image for this query, and
wherein $y_j^q$ is the combined label for $x_j^q$.

7. The method of claim 6, wherein said ranking function is determined from the following equation:

$$f^* = \underset{f \in F}{\mathrm{argmin}} L(f, \{(x_j^q, y_j^q)\}),$$

wherein F is a search space for identifying said set of candidate images, and
wherein L represents the combined logistic loss function and pair-wise loss function.

8. The method of claim 1, wherein said combined logistic loss function and pair-wise loss function is represented as follows:

$$L(f, \{(x_j^q, y_j^q, z_j^q)\}) = \sum_{q,j} \log(1 + \exp(-z_j^q)f(x_j^q))) +$$

$$\alpha \sum_q \sum_{i,j,y_i^q > y_j^q}^{m_q} \max(0, 1 - f(x_i^q) + f(x_j^q))^2$$

wherein α is a parameter for balancing the logistic loss function and pair-wise loss function.

9. The method of claim 8, wherein the combined logistic loss function and pair-wise loss function applies a binary flattening of the grade values for each candidate image, wherein said grade for each candidate image is either a positive (+1) or negative (−1).

10. The method of claim 1, further comprising:
determining whether said score for each candidate image satisfies a score threshold, wherein said ranked set of images only includes those candidate images that have scores satisfying said score threshold.

11. The method of claim 1, further comprising:
determining a context of the search result, said context being in accordance with said image content;
causing communication, over the network, of said context to an advertisement platform to obtain digital advertisement content associated with said context; and
communicating a digital content item comprising said digital advertisement content in accordance with said search result.

12. A non-transitory computer-readable storage medium tangibly encoded with computer-executable instructions, that when executed by a processor associated with a computing device, performs a method comprising:
receiving a request for image content;
identifying a set of candidate images, said identifying comprising searching a database of images and identifying images that correspond to the requested image content;
translating, using vector analysis software, each identified candidate image into a feature vector, said feature vector comprising information associated with features of each candidate image;
applying a ranking function to each feature vector, said application comprising calculating a score for each candidate image based on the ranking function being applied to the feature vector of each candidate image, said ranking function comprising a combined logistic loss function and pair-wise loss function, said application of the ranking function further comprising simultaneously determining a quality value and relevance value for each candidate image via the combined logistic loss function and pair-wise function of the ranking function;

determining query-image pairs based on the received request and the identified candidate images, each query-image pair comprising information associated with the received request and an individual candidate image from the set of candidate images;

assigning said calculated score for a candidate image to its respective query-image pair;

ranking the set of candidate images based on the scores of the applied ranking function, wherein candidate images with higher scores are ranked higher in said set than those with lower scores; and communicating, over the network, a search result to a user in response to said request for image content, said search result comprising said ranked set of candidate images.

13. The non-transitory computer-readable storage medium of claim 12, wherein said ranking function further comprises a gradient boosting algorithm applied to the combined logistic loss function and pair-wise loss function for minimizing loss.

14. The non-transitory computer-readable storage medium of claim 12, wherein said combined logistic loss function and pair-wise loss function is constructed from labeled training data, wherein said training data comprises a set of query-image pairs represented as a set of triples {query, document, grade}.

15. The non-transitory computer-readable storage medium of claim 14, wherein each query-image pair is labeled with the relevance value and the quality value, wherein said relevance value and said quality value for each query-image pair is combined into a 5-point PEGFB label which is applied to each query-image pair, wherein said PEGFB label provides the grade of the triples which is an indication of an editorial judgment value of each query-image pair in the training data.

16. The non-transitory computer-readable storage medium of claim 15, wherein said PEGFB labeling results in the training data being represented as $\{(x_j^q, y_j^q)\}$, wherein q goes from 1 to n (the number of queries), wherein j goes from 1 to $m_q$ (the number of images for query q), wherein $x_j^q \in R^d$ is the d-dimensional feature vector for the pair of query q and the $j^{th}$ image for this query, and wherein $y_j^q$ is the combined label for $x_j^q$.

17. The non-transitory computer-readable storage medium of claim 16, wherein said ranking function is determined from the following equation:

$$f^* = \underset{f \in F}{\operatorname{argmin}} L(f, \{(x_j^q, y_j^q)\}),$$

wherein F is a search space for identifying said set of candidate images, and wherein L represents the combined logistic loss function and pair-wise loss function.

18. A system comprising:

a processor; and a non-transitory computer-readable storage medium for tangibly storing thereon program logic for execution by the processor, the program logic comprising:

logic executed by the processor for receiving a request for image content;

logic executed by the processor for identifying a set of candidate images, said identifying comprising searching a database of images and identifying images that correspond to the requested image content;

logic executed by the processor for translating, using vector analysis software, each identified candidate image into a feature vector, said feature vector comprising information associated with features of each candidate image;

logic executed by the processor for applying a ranking function to each feature vector, said application comprising calculating a score for each candidate image based on the ranking function being applied to the feature vector of each candidate image, said ranking function comprising a combined logistic loss function and pair-wise loss function, said application of the ranking function further comprising simultaneously determining a quality value and relevance value for each candidate image via the combined logistic loss function and pair-wise function of the ranking function;

logic executed by the processor for determining query-image pairs based on the received request and the identified candidate images, each query-image pair comprising information associated with the received request and an individual candidate image from the set of candidate images;

logic executed by the processor for assigning said calculated score for a candidate image to its respective query-image pair;

logic executed by the processor for ranking the set of candidate images based on the scores of the applied ranking function, wherein candidate images with higher scores are ranked higher in said set than those with lower scores; and logic executed by the processor for communicating, over the network, a search result to a user in response to said request for image content, said search result comprising said ranked set of candidate images.

* * * * *